United States Patent [19]

Jones

[11] Patent Number: 4,606,927
[45] Date of Patent: Aug. 19, 1986

[54] ARTICLE IDENTIFICATION

[76] Inventor: Ronald L. Jones, 3929 Twilight, #212, Topeka, Kans. 66614

[21] Appl. No.: 521,935

[22] Filed: Aug. 10, 1983

[51] Int. Cl.$^4$ .............................................. B41M 3/14
[52] U.S. Cl. ..................................... 427/7; 427/157; 427/292; 427/197; 427/198; 427/199; 427/385.5; 427/388.1
[58] Field of Search ................... 427/7, 157, 292, 197, 427/198, 199, 385.5, 388.1

[56] References Cited

U.S. PATENT DOCUMENTS

| | | | |
|---|---|---|---|
| 447,336 | 3/1891 | MacDonough | 164/140 |
| 4,097,279 | 6/1978 | Whitehead | 427/197 |

FOREIGN PATENT DOCUMENTS

| | | | |
|---|---|---|---|
| 61460 | 3/1891 | Fed. Rep. of Germany. | |
| 3332428 | 3/1984 | Fed. Rep. of Germany | 427/7 |
| 4519451 | 6/1966 | Japan | 427/7 |

*Primary Examiner*—John D. Smith
*Assistant Examiner*—Janyce A. Bell
*Attorney, Agent, or Firm*—Robert E. Breidenthal

[57] ABSTRACT

A minute color coded identifier having a longitudinal axis, which is transversely color banded about its periphery. The identifier may, for example, be 0.015 inch long, have a transverse dimension of about 0.004 inch and have seven or more color bands such as to be observable under a power of 10 or more magnification. A method of making such identifiers, as well as a method of applying the same to articles for later identification is disclosed that involves a dispersion of identifiers in a transparent and hardenable cementitious liquid such as nitrocellulose in a suitable volatile solvent such as acetone and ethyl acetate, e.g. a common clear fingernail polish.

8 Claims, 7 Drawing Figures

U.S. Patent   Aug. 19, 1986   4,606,927
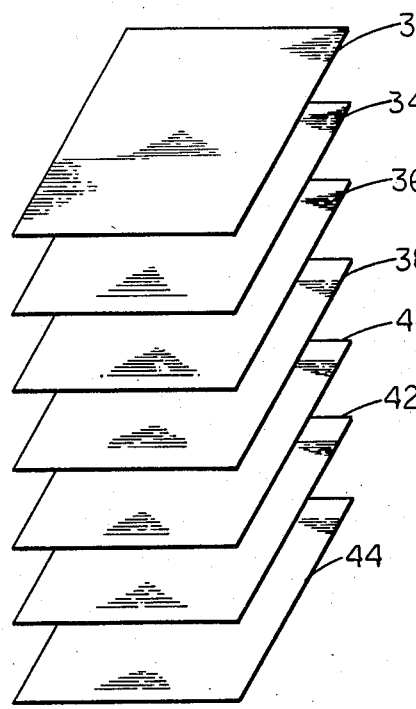
FIG 3
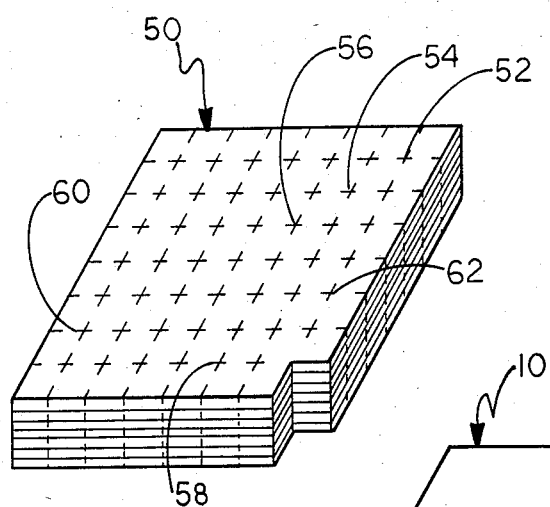
FIG 2
FIG 1
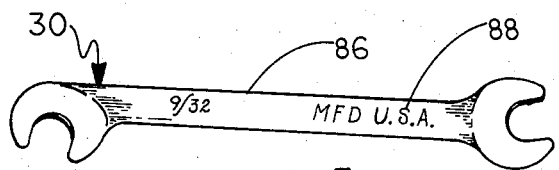
FIG 5
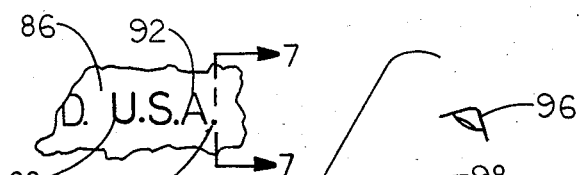
FIG 6
FIG 7
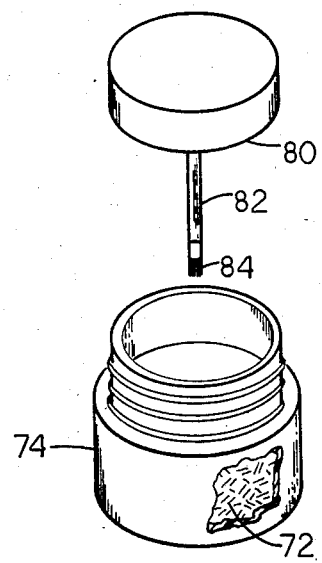
FIG 4

ARTICLE IDENTIFICATION

The present invention pertains to new and useful improvements in the prevention of or detection of theft by way of labeling or marking articles in an inconspicuous manner that enables subsequent positive identification of the articles.

Numerous proposals have heretofore been made pertaining to marking or labeling articles, and for an appreciation of the background, attention is directed to the following U.S. patents, the disclosures of which are incorporated herein by way of reference thereto:

U.S. Pat. No. 3,801,775 Method and Apparatus for Identifying objects
U.S. Pat. No. 3,950,870 Personal Property Identification Labels
U.S. Pat. No. 4,204,639 Coded Label
U.S. Pat. No. 3,552,853 Hologramic Identification System
U.S. Pat. No. 4,168,586 Identification Method and Structure
U.S. Pat. No. 4,243,734 Micro-Dot Identification
U.S. Pat. No. 4,065,343 Label System for Package and Baggage Handling
U.S. Pat. No. 4,359,633 Spectrally-Limited Bar-Code Label and Identification Card The paramount object of the subject invention is to provide a durable and minute identifier of which a great number of a unique coding can be readily made, with such coding being such as to be readily identified under magnification readily realizable with a hand magnifier.

Another important object is to provide a method of applying the identifiers to an article in such a manner as to be inconspicuous thereon, and yet easily located and visually identified or decoded in situ (that is, while on the article) on use of a handheld magnifier.

Yet another important object is to provide a dispersion of identifiers such as mentioned above in a transparent cementitious liquid.

A broad aspect of the invention involves the method of making identifiable an article with identifiers that are visually distinguishable under magnification comprising the steps of dispersing a multiplicity of identifiers that are uniquely visually distinguishable in a transparent liquid of adhesive character, applying a portion of the liquid dispersion that contains at least one identifier to a limited area of the surface of the article for adhesion thereto, and thereafter causing the liquid portion to harden to a solid, whereby the included identifier is bound to the article and encased by a transparent solid.

Another broad aspect of the invention involves the method of making a plurality of visually distinguishable identifiers comprising the steps of providing a plurality of sheets of differently colored materials, superposing the sheets of material and causing them to adhere to each other to form an integral multi-layered stack, subdividing the stack by cutting into a multiplicity of stacks each having transverse dimensions substantially smaller than the height of the initially formed stack.

Still another broad aspect of the invention involves an identifier comprising an elongated prism-like body that has a series of differently colored color bands extending about the entire transverse perimeter thereof along the longitudinal extent of the body, with said body having a length less than about 0.05 inch, transverse dimensions less than about 0.01 inch, and having at least seven colored bands.

Other objects, aspects, features and advantages of the invention will become manifest in the light of the following description of a preferred embodiment of the invention and its practice, such description being given in conjunction with the accompanying drawings, wherein:

FIG. 1 is an isometric view of an identifier;

FIG. 2 is an isometric view of a multilayered integral stack suitable for subdivision or cutting along the dashed lines to form a multiplicity of identifiers such as shown in FIG. 1;

FIG. 3 illustrates on an enlarged scale a multiplicity of variously colored sheets of material at a stage preparatory to forming the stack shown in FIG. 2 therefrom;

FIG. 4 illustrates on a greatly reduced scale a container and a combination closure or cap and applicator. A wall of the container is partially broken away to show a transparent cementitious liquid therein in which a great number of identifiers are dispersed;

FIG. 5 is an elevational view of a hand tool representative of an article marked or labeled in accordance with the present invention;

FIG. 6 is an enlarged fragmentary view of a labeled portion of the article shown in FIG. 5; and, FIG. 7 is a sectional view taken upon the section line 7—7 in FIG. 6 to schematically depict visual inspection thereof under magnification.

Referring now to the drawings, wherein like numerals designate like parts throughout the various views, attention is initially directed to the identifier designated generally at 10 and shown in FIG. 1.

The identifier or laminate 10 is an integral series or stack of differently colored layers of material such as those indicated at 12, 14, 16, 18, 20, 22 and 24. Viewed from any side, the identifier presents the same sequence of colors that is in turn defined by the color of the individual layers 12 through 24.

While only the edges of the layers 12–24 need be colored, it is preferred that each layer 12–24 be uniformly colored throughout its three-dimensional extent.

While the identifier 10 is shown as being comprised of seven layers 12–24, the same may be constituted of a greater number, conveniently, as many as ten or more. Alternatively, if a lesser number will suffice for identification purposes as will be presently explained, fewer than seven may be employed. When a small number of layers is being considered, it should be kept in mind that, while not imperative, it is generally preferred that the height of an identifier be greater than at least one of its transverse dimensions. Such desideratum can usually be realized on using thicker layers when the number of the latter is few.

With further reference to the thickness of the layers of the identifier 10, the layers need not each be of a uniform thickness as shown, and can be various thicknesses, and indeed no two need be the same thickness. It is preferred that the layers be thin, but of sufficient thickness that the color of the same can be visually ascertained with a handheld magnifier of say about 15 to about 30 power when the object is illuminated with an incandescent lamp such as is often operatively associated with hand-held magnifiers.

The identifier 10 is shown as being rectangular in cross section with the layers 12–24 being of uniform and equal thickness normal to the vertical or longitudinal dimension of the same. Such an identifier 10 has a height in the range of about 0.015 to about 0.025 inch, preferably about 0.020 inch; and transverse dimensions on the order of about 0.002 inch to about 0.004, with about 0.003 inch being preferred for a major transverse dimension and with about 0.003 inch being preferred for a minor transverse dimension. Exemplary of dimensions of an identifier may be one of about 0.005 inch height, and having transverse dimensions of about 0.004 inch each when of square cross section.

While the illustrated identifier 10 is of rectangular configuration, the same may in general, if deemed desirable or expedient, be of prism configuration of three or more sides with the top and bottom layers (12 and 24) constituting the bases. Indeed, the identifier can be of any suitable cylindrical configuration in the broad sense of such term and such a cylinder need not be either circular or have ends at right angles to the axis of the cylinder.

Regardless of the specific type of configuration selected for the identifier, it is again noted that such selection be made with it being kept in mind that it is much preferred that the axial length of the identifier 10 between the end layers 12 and 24 be substantially greater than at least one of the dimensions normal to such axis for a reason to become manifest.

It is within the purview of the present invention that the term "color" is applicable to black as well as to white or clear (transparent). In other words, the sequence of "colors" represented by the layers 12-24 could be, strictly by way of example, black, clear, black, clear, black, clear, and black; or on noting that a layer may have the same color as an immediately adjacent layer, the sequence could be black, black, clear, black, clear, black, and clear or red, red, clear, clear, black, clear, black.

It will be evident that by way of very simple coding the latter sequence would represent the number five or interpreting in the binary system that black and clear indicate ones and zeros respectively with the coding commencing from the red end of the identifier.

The potential for coding, especially on using more than seven layers and a variety of colors (grey, yellow, blue, green, purple, etc.) in addition to or in lieu of the black, clear, and red discussed above is enormous, while at the same time (according to any prearranged scheme), indication be included as to the direction to read the color sequence. It is thought well within the ordinary skill of the art to devise coding schemes by means of which an identifier 10 can be coded to uniquely identify a particular person that desires to mark items or articles of his property such as the hand tool designated generally at 30 in FIG. 5, with such coding being such as to be unambiguously decoded on visual of one or more side faces of the identifier 10 under hand-held magnifier magnification.

Having determined a unique color coding for a particular person or legal entity, a plurality of sheets of material 32, 34, 36, 38, 40, 42 and 44 that respectively correspond in color to the desired colors of the color bands or layers 12, 14, 16, 18, 20, 22 and 24 of the identifier 10 are superposed as shown in FIG. 3, and then positioned or pressed into contact with each other in such sequence.

The sheets of material are preferably of a synthetic resin such as polyethylene, polypropylene or polyester, and each incorporate therein suitable coloring agents. The sheets 32-44 can be thermoplastic and in addition may be selected to be such that they can be effectively welded together when pressed firmly together (at about 3 to about 5 pounds per square inch) for about ½ to 1 minutes when at a temperature of about 125 to 150 degrees Celcius in the case of polyethylene to form the stack 50 shown in FIG. 2 as an integral body constituted of layers of colored material. Typically, the sheets of plastic material 32-44 are from about 0.003 to about 0.004 inch in thickness.

In lieu of heat welding the sheets 32-44 into the integral body or stack 50, a suitable adhesive can be applied to the upper sides of the sheets 23-44 prior to contacting the sheets 32-44 together whereby the applied adhesive will serve to join the sheets to form the integral body or stack 50.

Cyclohexanone serves well as an adhesive when, for example, the sheets 32-44 are of polyvinyl chloride.

The body or stack 50 can be formed in ways other than described and it is evident that recourse can be had to the well developed technology for forming plastic laminates of different colored layers.

Identifiers such as the identifier 10 can be formed in large numbers upon suitably subdividing the stack 50. Such subdividing can, for example, be effected by vertically cutting the stack along closely spaced parallel lines such as those indicated at 52, 54 and 56 across the entire extent of the illustrated rectangular form of the stack 50, and thereafter cutting the stack along closely spaced parallel lines 58, 60, and 62 orthogonal to the lines 52, 54 and 56 across the entire extent of the stack 50. If desired the lines 52, 54 and 56 can each be progressively cut in sequence and the lines 58, 60 and 62 similarly cut in a fashion analogous to the manner customarily employed on a large scale in the cutting of layer cakes by bakers, or the cutting of pans of homemade fudge candy.

The particular identifier 10 may be deemed to have been initially at a corner of the stack 50, and severed therefrom by the cuts along lines 52 and 58.

It will be manifest that whatever procedure is employed for vertically subdividing the stack 50 to form the identifiers 10, each of the latter carries identical coded information initially predetermined by the color sequence of the sheets 32-44.

Having formed a multiplicity of identifiers 10, they are mixed into or dispersed in a clear cementitious liquid and placed in a dispensing container indicated at 74. The cementitious liquid with the identifiers 10 dispersed therein is designated by the reference numeral 72.

The cementitious liquid employed may be a solution of nitrocellulose in acetone and ethyl acetate and be in the nature of compositions having wide use as clear fingernail polish. A desirable property of such a cementitious liquid is that it strongly adheres to most clean and dry surfaces, and rapidly air dries to leave a thin, hard and clear deposit. For a purpose to become clear, it is preferred that the cementitious liquid also has dissolved therein a naphthenic solid that will be retained in solution without significantly discoloring or impairing the transparent character of the same. Anthracene may be mentioned as a suitable naphthenic compound. Only a small amount of such optional additive is necessary as its function is to reveal in darkness under ultraviolet illumination by fluoresence the location of a dried deposit of the cementitious liquid and such identifiers as were dispersed therein. In view of the foregoing, many other suitable fluorescing agents will come to the minds of those skilled in the art.

The container 74 may conveniently be of the character and even of the size of those in which clear fingernail polish is retailed, and preferably includes a screw cap closure 80 having an attached applicator stem 82 that terminates at its lower end in a small brush 84. The function of such items is well known, and it suffices to note that on removal of the cap 80, the brush 84 can be easily employed to apply a portion of cementitious liquid (and identifiers 10 dispersed therein) 72 by the brush 84 normally immersed therein.

The quantity of liquid typically applied by judicious or gingerly use of the brush 84 will statistically assure adherence of at least one and usually a plurality of identifiers to the article. Indeed, use of the brush 84 may be somewhat extravagant as to the number of identifiers expended. If such is the case, the user may if he desires cut the brush 84 from its stem 82 and thus be enabled to use the resulting free end or tip of the latter in lieu of the brush 84 to apply smaller quantities of lesser numbers of identifiers.

It has been found that a common toothipck can be used as the user can, if he so chooses, insert the toothpick in the liquid in such a manner as to fish out, so to speak, a single identifier and then transfer such identifier and adhering cementitious liquid to the surface of the article for adherence thereto. Needless to say, application in the manner last described makes for most economic use of identifiers and results in deposits that elude casual inspection of one of larcenous intent.

The marking of an article and its subsequent identification will be readily understood.

While any suitable surface of an article to which the liquid will adhere as well as its solid residue, it is preferred that the marking be at a location where it will be less susceptible to wear or inadvertent dislodgment and where it will be inconspicuous, especially to a thief who would, most likely, consciously attempt to dislodge the same. Both of such objectives can ordinarily be realized by applying the liquid 72 to some locally depressed surface of the article. Such a locally depressed area can be made in any suitable manner, however, such special provision need not be made as locally depressed areas usually occur in abundance.

For example, the shank 86 of the tool 30 has the legend "MFD U.S.A." die stamped therein as indicated at 88. Such legend 88 includes a period 90 stamped therein and such period or depression 90 as well as the depressed portion 92 of the stamped letter "A" immediately preceding the period 90 constitute by way of example suitable depressions for marking.

Assuming the handle 86 to be dry and clean, or preferably after treating the region of the legend 88 with a cleaning solvent such as carbon tetrochloride in a well ventilated space and wiping with a clean dry cloth to be oil-free and dry, the applicator brush 84 or a toothpick or the like is applied to deposit a portion of the liquid 72 into the depressions 90 and 92

The concentration of identifiers 10 in the liquid 72 and the size of the applied portions (such as the portion 94 applied in the period 90—see FIG. 7) are such that the brush applied portion 94 will have a statistical probability verging on certainty of at least one dispersed identifier 10 being dispersed in such portion. This ordinarily entails about 500 identifiers being dispersed in a final volume of one cubic centimeter. The alternative use of a toothpick or the like as an applicator will be recalled.

The applied portions are preferably applied with a thickness or depth such that on drying, the thickness will be such that any included identifier 10 will tend to have its longest dimension parallel to rather than perpendicular to the surface of the dried or hardened clear residue in which the identifier is encased. This tends to place a colored sequence or face of the encased identifier 10 in a position for better viewing by the observer's eye 96 through a magnifier 98 as shown in FIG. 7.

Not only does the marker 94 tend to elude the naked eye of a thief, it is not readily susceptible to location by an experienced inspector who may not even be certain the article 30 is marked at all, much less the precise location of the marker 94.

The fact that an article is marked or unmarked and in the case of the former the precise location of the marker 94 can be detected by making an overall inspection of the article 30 in darkness under ultraviolet illumination. The marker 94 will reveal its presence and location by fluorescing, after which the magnifier 98 can be brought into play to determine with high certainty the identity of the owner of the article.

It will have been manifest to those skilled in the art that the substances specified as being suitable for the identifiers and the cementitious liquid were such as to be compatible with each other. It will be equally manifest that it is within the scope of the invention the identifiers and the cementitious liquid can be made of a wide variety of other substances so long as they are compatible with each other in the sense of not being chemically reactive with each other, or the identifiers being soluble in or being excessively softened by the liquid, etc.

Having fully described the invention and its practice, attention is now directed to the appended claims for an appreciation of the actual scope of the invention.

I claim:

1. The method of making identifiable an article with identifiers that are visually distinguishable under magnification comprising the steps of dispersing a multiplicity of identifiers that are uniquely visually distinguishable in a transparent liquid of adhesive character, applying a sufficiently large portion of the liquid dispersion to include at least one of the identifiers dispersed therein to a limited area of the surface of the article for adhesion thereto, and thereafter hardening the liquid portion to a solid, whereby the included identifier is bound to the article and encased by a transparent solid.

2. The combination of claim 1, wherein the limited area is at least in part coincident with a locally depressed surface area of the article, whereby the included and encased identifier is reposed in an article depression so as to be substantially less susceptible to either casual visual discovery or inadvertent dislodgment from the article.

3. The method of claim 1, wherein the liquid includes a substance of such character that the resultant solid encasing the identifier will fluoresce under ultraviolet illumination whereby such solid can be readily located for subsequent visual inspection under magnification of the identifier encased therein.

4. The method of claim 1, together with the subsequent step of visually examining the encased identifier in situ under magnification whereby the uniqueness of the identifier and the ownership of the article to which it is bound can be established.

5. The method of claim 1, wherein the identifier has a major dimension and relatively small dimension transverse to the major dimension, and wherein said identifier has at least two diametrically opposed faces that present a sequence of visually distinguishable characteristics along the major dimension thereof, with the faces being spaced by said small dimension, whereby the faces of the identifiers tend toward parallelism with the surface of the article thereby enhancing visibility thereof.

6. The method of claim 1, wherein each of the identifiers has a major dimension, wherein all sides of each of the identifiers present a sequence of color bands along the major extent of each identifier.

7. The method of claim 6, wherein each of the identifiers is an elongated prism-like body having a series of differently colored color bands extending about the transverse periphery thereof, and wherein the body has a length of less than about 0.05 inch and transverse dimensions of less than about 0.01 inch, whereby an application of liquid less than about 0.05 inch thick on an article has a high probability of having an identifier contained therein disposed to present a side or facet thereof that faces outwardly from the article.

8. The method of claim 7, wherein said portion of liquid is applied to the article in a layer of less than about 0.05 inch.

* * * * *